United States Patent
Uhler

(10) Patent No.: US 7,975,820 B2
(45) Date of Patent: Jul. 12, 2011

(54) RADIAL FLOW CHAMBER FOR CLUTCHES IN A CLUTCH ASSEMBLY

(75) Inventor: Adam Uhler, Sterling, OH (US)

(73) Assignee: Schaffler Technologies GmbH & Co. KG, Herzogenaurach (DE)

( * ) Notice: Subject to any disclaimer, the term of this patent is extended or adjusted under 35 U.S.C. 154(b) by 478 days.

(21) Appl. No.: 11/732,046

(22) Filed: Apr. 2, 2007

(65) Prior Publication Data

US 2007/0227852 A1 Oct. 4, 2007

Related U.S. Application Data

(60) Provisional application No. 60/788,953, filed on Apr. 4, 2006.

(51) Int. Cl.
*F16D 13/56* (2006.01)
*F16D 13/72* (2006.01)
*F16D 47/00* (2006.01)

(52) U.S. Cl. .............. 192/48.8; 192/70.12; 192/113.34

(58) Field of Classification Search ............. 192/70.12, 192/70.2, 113.24, 48.619
See application file for complete search history.

(56) References Cited

U.S. PATENT DOCUMENTS

| | | | |
|---|---|---|---|
| 2,742,129 A | 4/1956 | Palm | |
| 4,413,716 A | 11/1983 | Newsome et al. | |
| 4,446,953 A * | 5/1984 | Voss et al. | 192/70.12 |
| 4,473,144 A | 9/1984 | Allori | |
| 5,421,438 A * | 6/1995 | Flotow et al. | 192/70.12 |
| 6,059,682 A * | 5/2000 | Friedmann et al. | 192/48.619 |
| 6,523,657 B1 * | 2/2003 | Kundermann et al. | 192/48.8 |
| 2005/0139442 A1 | 6/2005 | Agner et al. | |
| 2005/0279603 A1 | 12/2005 | Agner | |

FOREIGN PATENT DOCUMENTS

| | | |
|---|---|---|
| DE | 10308137 | 9/2004 |
| EP | 1738951 | 1/2007 |
| JP | 2004-197777 | 7/2004 |

\* cited by examiner

*Primary Examiner* — Rodney H Bonck

(74) *Attorney, Agent, or Firm* — Simpson & Simpson, PLLC

(57) ABSTRACT

The present invention broadly comprises a clutch assembly with a radial flow chamber including a first hub and a carrier. The first hub and carrier form at least one first opening and a first portion of at least one radial chamber or passageway in the clutch assembly. First and second radially disposed segments of the first hub and carrier, respectively, partially define the first portion. A second portion of the chamber is formed between the first segment and a third radially disposed segment connected to a second hub. Openings in the first segment connect the first and second portions. A third portion of the passageway is formed between the second segment and a fourth radially disposed segment. A plate forms at least a portion of an axial barrier with respect to a second clutch in the clutch assembly.

21 Claims, 5 Drawing Sheets

US 7,975,820 B2

RADIAL FLOW CHAMBER FOR CLUTCHES IN A CLUTCH ASSEMBLY

CROSS-REFERENCE TO RELATED APPLICATIONS

This application claims the benefit under 35 U.S.C. §119(e) of U.S. Provisional Application No. 60/788,953, filed Apr. 4, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a clutch assembly having a radially disposed fluid flow chamber. Specifically, the chamber utilizes hubs and carriers in the clutch assembly.

BACKGROUND OF THE INVENTION

Proper flow of cooling fluid to wet-clutches in a clutch assembly is vital to the proper performance of the wet-clutches. Also, proper flow of cooling fluid results in a longer usable life time for the clutches. Typically, cooling fluid enters the clutch assembly near an inner circumference for the assembly and is pushed radially outward, toward the clutches, by the centrifugal force generated by the operation of the clutch assembly. However, many clutch assemblies include axial openings through which cooling fluid can flow out of the assembly. Thus, as the cooling fluid is pushed radially outward, it also leaks axially out of the assembly, reducing the amount of cooling fluid reaching the clutches. It is known to use extra components, such as plates and deflectors, to block these openings. Unfortunately, these components are in addition to components already necessary for the functioning of the clutch assembly. Therefore, these extra components add to the size of the clutch assembly and the cost and complexity of building the assembly.

Thus, there is a long-felt need for a clutch assembly that uses to the greatest extent possible, components, already in place for the mechanical operation of the assembly, to provide flow channels or chambers that minimize axial flow out of the assembly.

BRIEF SUMMARY OF THE INVENTION

The present invention broadly comprises a hub and carrier assembly including a hub and a clutch carrier forming at least one first opening. The hub and carrier also form at least one chamber and the at least one first opening and the at least one chamber are in fluid communication. In some aspects, the at least one first opening is axially aligned, the at least one first opening is formed proximate a shaft interface for the hub, or the at least one first opening is a single opening. The hub and carrier include first and second radially disposed segments, respectively. A portion of the at least one chamber is formed between the first and second radially disposed segments and the first radially disposed segment includes at least one second opening in fluid communication with the at least one chamber. In some aspects, the at least one first and second openings form the only openings to the at least one chamber. In some aspects, the first and second radially disposed segments are fixedly secured one to the other, the first and second radially disposed segments are arranged to transfer torque to the hub, or the at least one second opening is radially aligned.

The present invention also broadly comprises a clutch assembly with a radial flow chamber including a first hub and a carrier for a clutch in the assembly. The carrier forms at least one first opening with the first hub and the first hub and the carrier form a first portion of at least one radial chamber or passageway in the clutch assembly. The at least one first opening and the at least one passageway are in fluid communication. In some aspects, the at least one chamber is substantially radially continuous. In some aspects, the at least one first opening is axially aligned, the at least one first opening is formed proximate a shaft interface for the first hub, or the at least one first opening is circumferentially continuous. The first hub and the first carrier include first and second radially disposed segments, respectively. The first and second radially disposed segments partially form said first portion and the first radially disposed segment includes at least one second opening. In some aspects, the first and second radially disposed segments are fixedly secured one to the other or transmit torque to the first hub.

In some aspects, the clutch assembly includes a third radially disposed segment connected to a second hub in the clutch assembly. A second portion of the at least one chamber is formed between the first and third radially disposed segments. The at least one second opening is in fluid communication with the first and second portions. In some aspects, the clutch assembly includes a fourth radially disposed segment, a third portion of the chamber is formed between the second and fourth radially disposed segments, and the third portion is in fluid communication with the first clutch. In some aspects, the fourth radially disposed segment is a first plate, the fourth radially disposed segment is integral to the third segment, or the clutch assembly includes a second carrier for a second clutch and the fourth radially disposed segment is formed by the second carrier. In some aspects, the clutch assembly includes a second plate and a third clutch and the second plate forms at least a portion of an axial barrier with respect to the third clutch.

It is a general object of the present invention to provide a clutch assembly with improved fluid flow to clutches in said assembly.

It is another object of the present invention to provide a clutch assembly with improved fluid flow to clutches in said assembly by using to the extent possible, components necessary for the mechanical functioning of the assembly.

It is yet another object of the present invention to provide a clutch assembly, using stamped components, with improved fluid flow to clutches in said assembly.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In general, a present invention hub and carrier assembly is arranged to direct fluid flow in a clutch assembly in which the assembly is housed. In particular, the assembly is arranged to optimize flow radially outward and to control or minimize axial flow, especially axial flow out of the clutch assembly. During operation of the clutch assembly, centrifugal force tends to force fluid in the clutch assembly radially outward. Therefore, in general, a present invention assembly is arranged to form at least one radially continuous path, passageway, or chamber from a point or points at or near an inner circumference of the clutch assembly to a point or points at or near an outer circumference for the carrier. That is, the path is in fluid communication with the starting and ending points.

Figure 1:
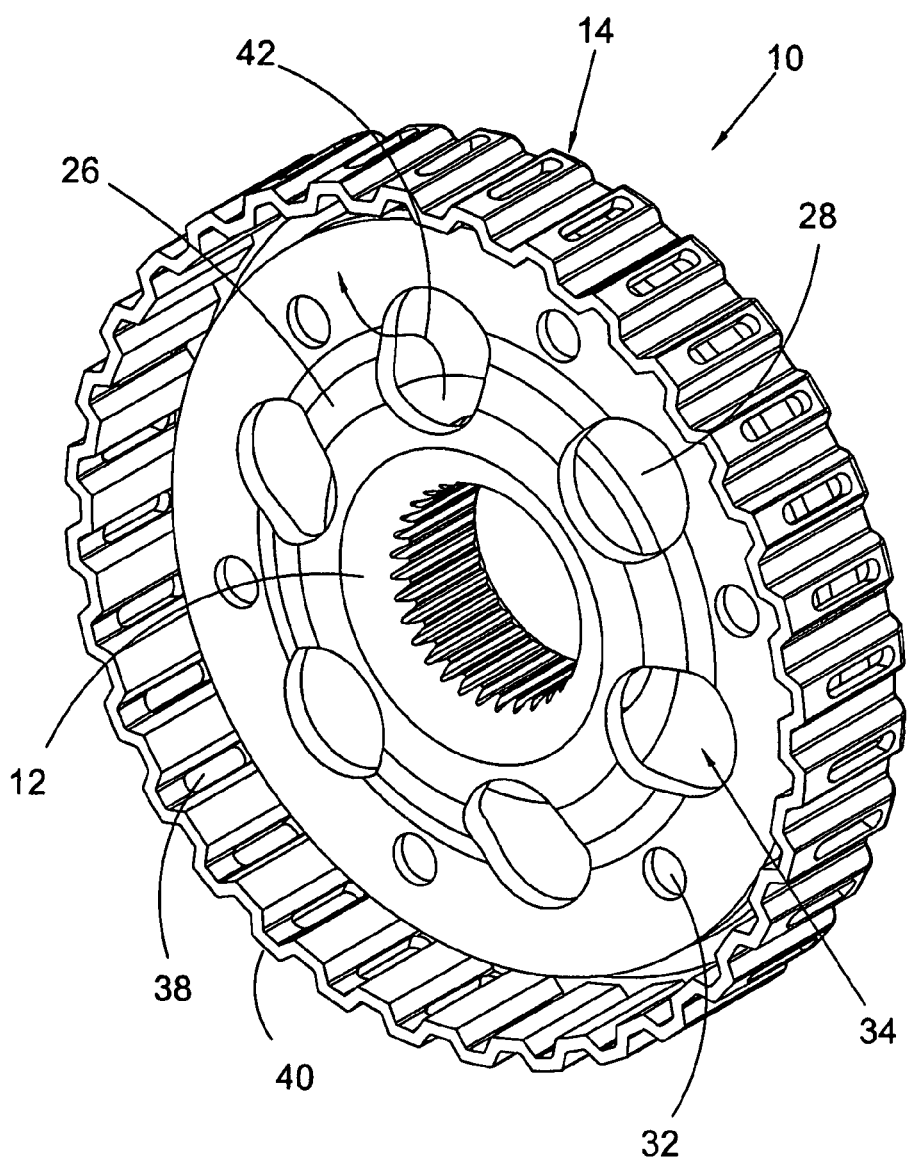
FIG. 1 is a front perspective view of a present invention hub and carrier assembly.

FIG. 1 is a front perspective view of present invention hub and carrier assembly 10.

Figure 2:
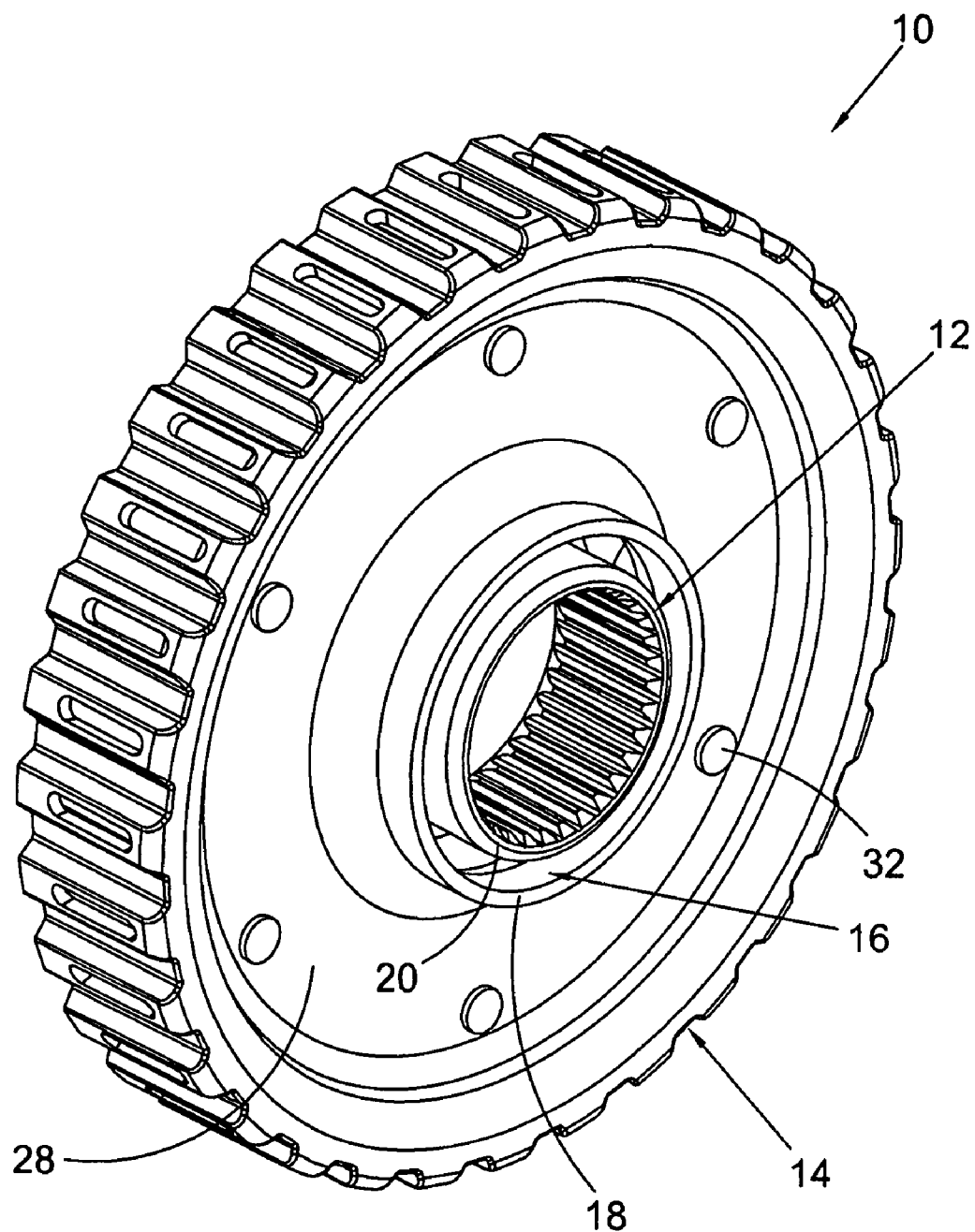
FIG. 2 is a back perspective view of the hub and carrier assembly shown in FIG. 1.

FIG. 2 is a back perspective view of hub and carrier assembly 10. The following should be viewed in light of FIGS. 1 and 2. Assembly 10 includes hub 12 and carrier 14 for a clutch (not shown) in a clutch assembly (not shown) housing assembly 10. Hub 12 and carrier 14 form at least one opening 16. In some aspects, opening 16 is axially disposed, that is, the opening is generally aligned parallel to a rotational, or longitudinal, axis (not shown) for the assembly. An axial orientation can be useful in interfacing the assembly with other components in the drive train for a vehicle housing assembly 10. Opening 16 is arranged to accept and guide fluid, for example, cooling fluid. In some aspects, carrier 14 includes edge 18, hub 12 includes interface 20 for a shaft (not shown), and opening 16 is formed proximate the interface and edge 18. In some aspects, opening 16 is circumferentially continuous, that is, forms a single opening. In some aspects (not shown), opening 16 includes a plurality of sections separated by segments radially disposed between hub 12 and carrier 14.

Figure 3:
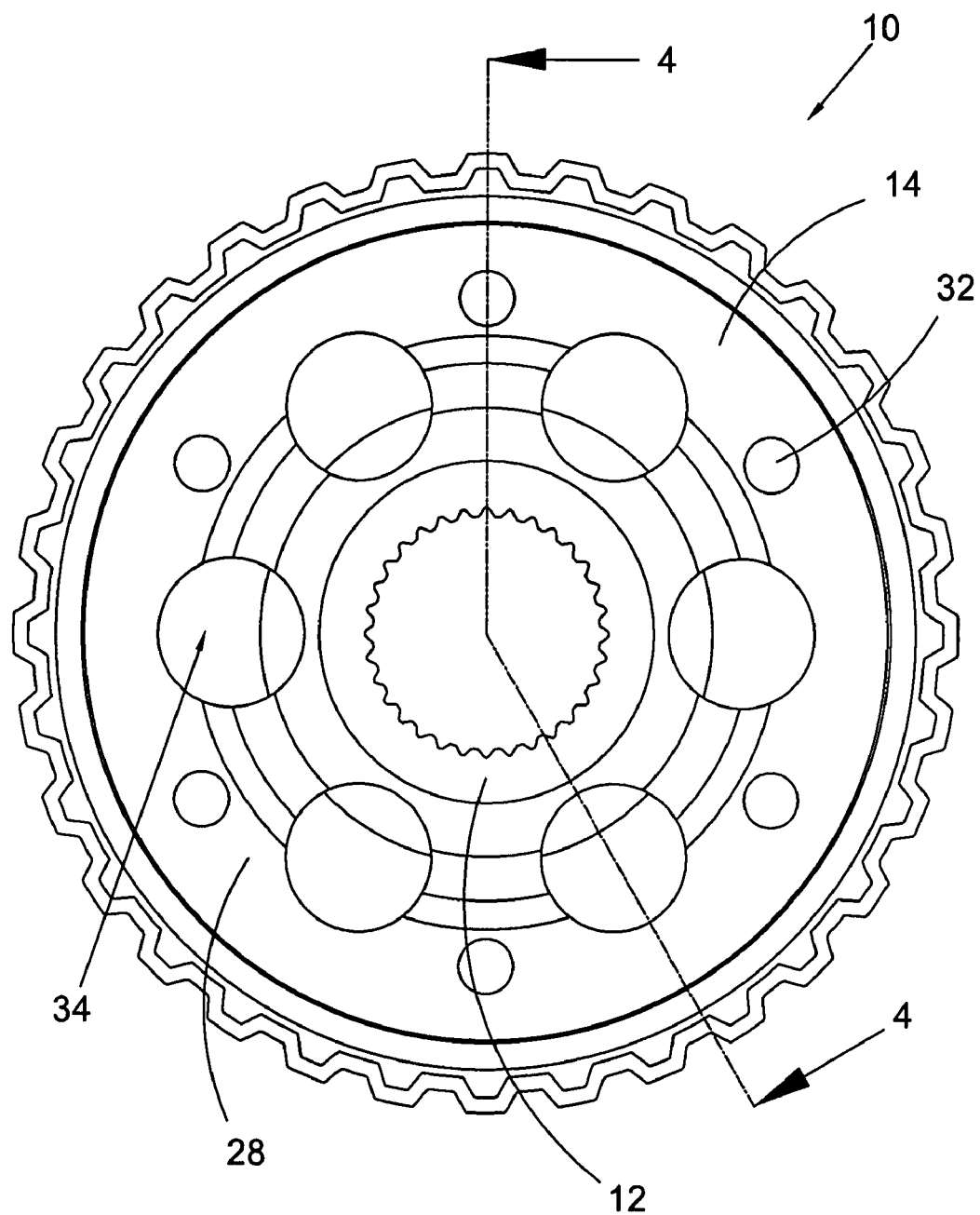
FIG. 3 is a front view of the hub and carrier assembly shown in FIG. 1.

FIG. 3 is a front view of hub and carrier assembly 10.

Figure 4:
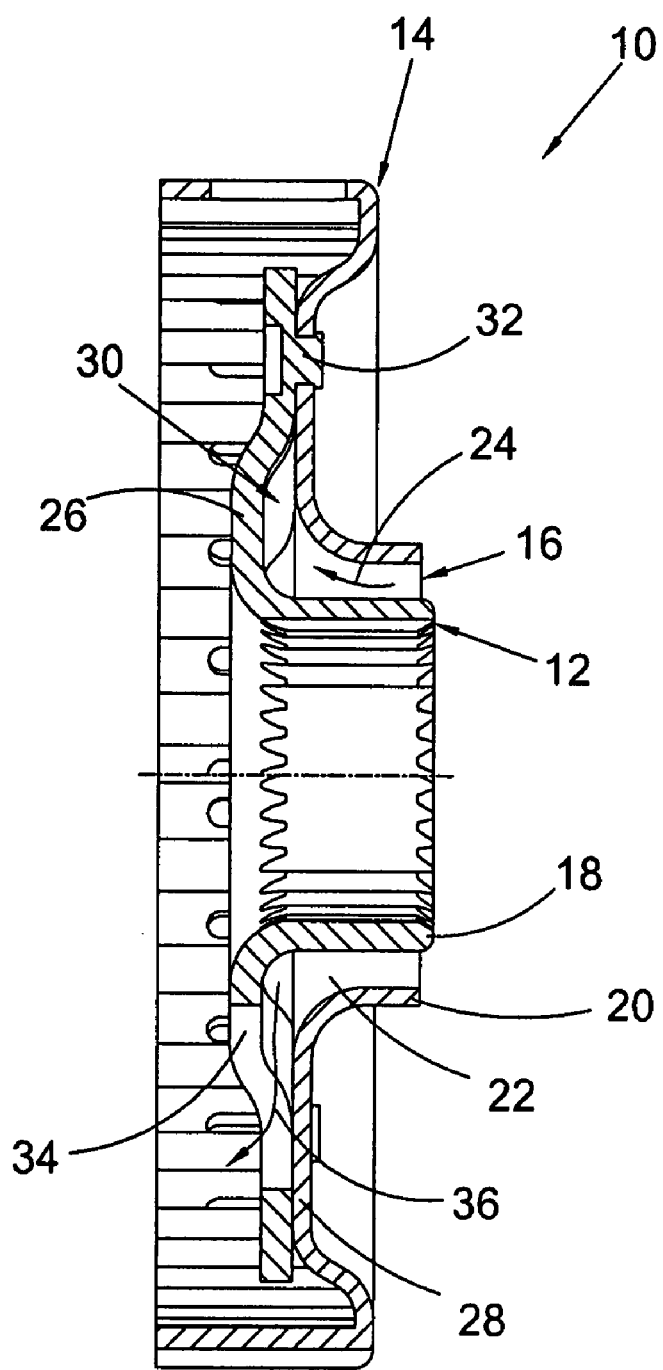
FIG. 4 is a cross-sectional view of the hub and carrier assembly shown in FIG. 1 along line 4-4 in FIG. 3; and, FIG. 5 is a cross-sectional view of a present invention clutch assembly with a radial flow chamber.

FIG. 4 is a cross-sectional view of hub and carrier assembly 10 along line 4-4 in FIG. 3. The following should be viewed in light of FIGS. 1 through 4. Hub 12 and carrier 14 also form portion 22 of at least one radial passageway, or chamber, (shown infra) in the clutch assembly. The radial passageway, and portion 22 in particular, are arranged to guide fluid, for example, as shown by arrow 24. The radial passageway is further described infra. For example, opening 16 and portion 22 are in fluid communication. Radially disposed, that is, disposed substantially orthogonal to the axis for the assembly, segments 26 and 28 of hub 12 and carrier 14, respectively, form portion 30 of the passageway. That is, the segments partially define the passageway. In some aspects, segments 26 and 28 are formed integrally with hub 12 and carrier 14, respectively. In some aspects (not shown), segments 26 and 28 are formed separately from hub 12 and carrier 14, respectively, and joined to hub 12 and carrier 14, respectively, by any means known in the art, including but not limited to welding, rivets, or tabs.

In some aspects, segments 26 and 28 are fixedly secured to each other using any means known in the art, for example, extruded rivets 32. It should be understood that the present invention is not limited to a particular number or configuration of fastening means for segments 26 and 28. Segments 26 and 28 carry, transmit, or transfer torque from a clutch (not shown) attached to carrier 14 to an output shaft (not shown) attached to hub 12. Carrier 14, in particular, segment 26, includes at least one opening 34. It should be understood that the present invention is not limited to a particular number or configuration of openings 34. Openings 34 are arranged to direct fluid flow as shown by arrow 36. In some aspects, portions 22 and 30 are substantially fluid-tight with the exception of openings 16 and 34. That is, openings 16 and 34 are the only openings to the portions.

In some aspects, openings 16 and 34 and portions 22 and 30 are arranged to direct fluid flow to openings 38 in outer circumference 40 of carrier 14. Circumference 40 is configured to engage an inner circumference of a clutch pack (not shown) and openings 34 are arranged to direct fluid to openings 38 and the clutch pack, for example, as shown by arrow 42, cooling the clutch pack and improving the performance of the clutch pack and increasing the life-time of the clutch pack.

Hub 12 and carrier 14 can be formed by any means known in the art. In some aspects, hub 12 and carrier 14 are formed by stamping. When formed by stamping, no additional parts are needed to form segment 28 in carrier 14, in that the material forming segment 28 is typically included in the sheet of metal being stamped and instead of piercing out the material, the material is left in place.

In general, a present invention clutch assembly with a radial flow chamber is arranged to direct fluid flow in the clutch assembly. In particular, the assembly is arranged to optimize flow radially outward and to control or minimize axial flow, especially axial flow out of the clutch assembly. During operation of the clutch assembly, centrifugal force tends to force fluid in the clutch assembly radially outward. Therefore, in general, a present invention clutch assembly is arranged to form at least one radially continuous path, passageway, or chamber, that is, a radial flow chamber, from a point or points at or near an inner circumference of the clutch assembly to a point or points at or near clutches for the assembly. That is, the path is in fluid communication with said starting and ending points.

Figure 5:
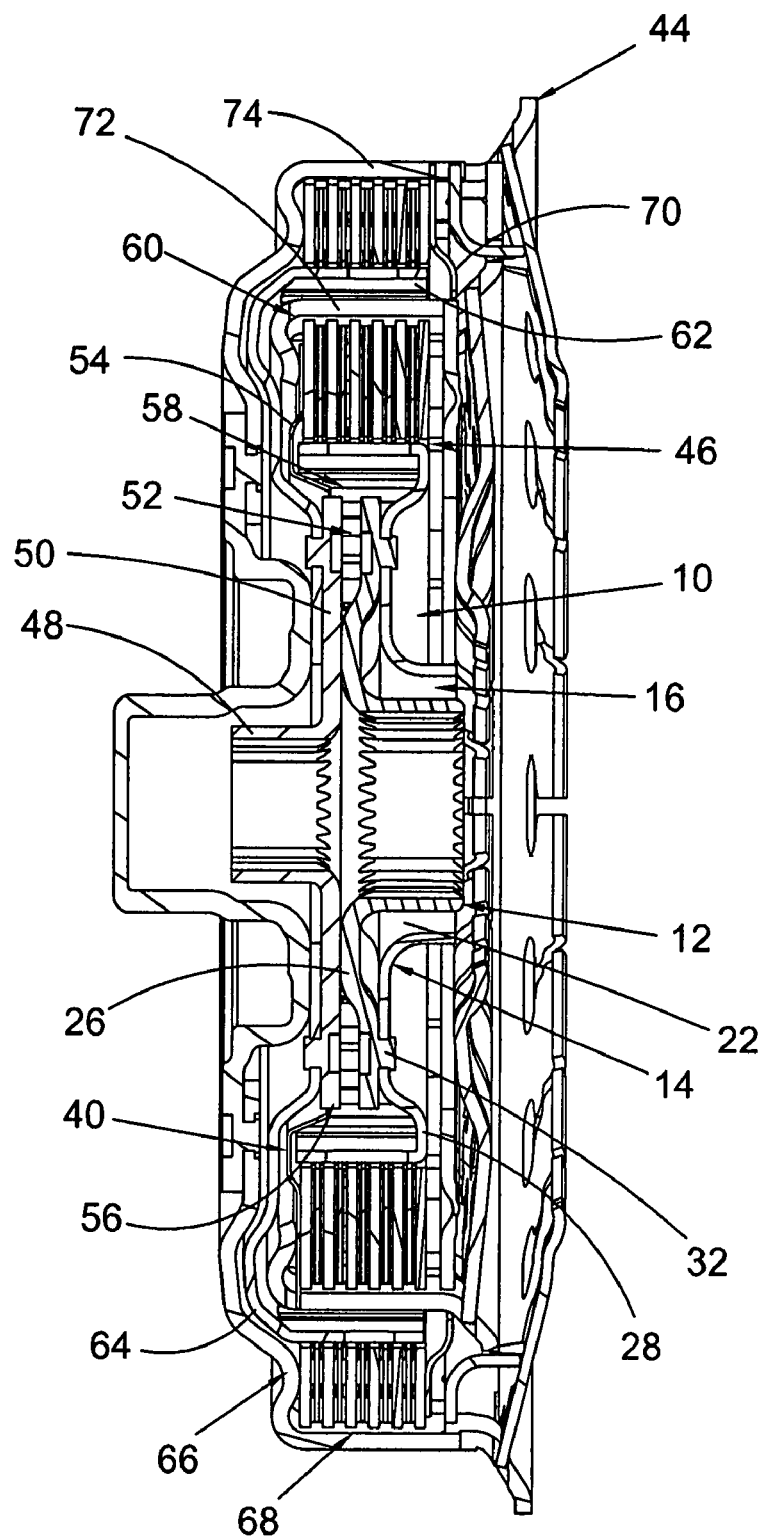

FIG. 5 is a cross-sectional view of present invention clutch assembly 44 with a radial flow chamber. The following should be viewed in light of FIGS. 1 through 5. Assembly 44 includes assembly 10. In some aspects, a present invention clutch assembly is a dual clutch assembly, for example, assembly 44. However, it should be understood that present invention clutch housings are not limited to dual clutch assemblies. For example, a present invention clutch housing can be used in a single clutch arrangement (not shown), for example, in a launch clutch. Inner clutch 46 in assembly 44 includes hub 12 and carrier 14. Assembly 44 includes hub 48 and radially disposed segment 50 connected to the hub. As described supra, hub 12 and carrier 14 form portions of at least one radially continuous path, passageway, or chamber. Segment 50 and segment 26 form portion 52 of the passageway. Openings 34 are in fluid communication with portions 30 and 52 and are arranged to direct fluid from portion 30 to portion 52. In some aspects, segment 50 is formed integrally with hub 48. In some aspects (not shown), segment 50 is formed separately from hub 48 and joined to hub 48 by any means known in the art, including but not limited to welding, rivets, or tabs.

Assembly 44 includes radially disposed segment 54, radially disposed between outer circumference 56 of segment 50 and outer circumference 40 of carrier 14. In some aspects, segment 54 is plate 54. Segment 54 and segment 28 form portion 58 of the passageway. Portion 58 is operatively arranged to direct fluid flow to outer circumference 40, openings 38, and clutch pack 60. That is, portion 58 is in fluid communication with clutch pack 60. Alternately stated, portion 58 is a chamber at least partially formed by outer circumference 40 of carrier 14. In turn, segment 54 partially defines the chamber. During operation of assembly 44, fluid directed to openings 38 flows radially outward to outer circumference 62 of carrier 64 in outer clutch 66. In some aspects (not shown), segment 54 is formed by a radial extension of segment 50 or by carrier 64. In these aspects, the extension or housing can be configured to substantially follow the cross-sectional profile of segment 54.

In some aspects, to direct fluid flow radially outward through clutch pack 68 in outer clutch 66, assembly 44 includes plate 70 radially disposed between housing 72 for clutch 46 and housing 74 for clutch 66. Plate 70 forms at least a portion of an axial barrier with respect to clutch 66. In some aspects, plate 70 is a shim for clutch 66. Thus, segment 54 and plate 70 are arranged to reduce, if not eliminate, axial flow of cooling fluid through the respective areas in which the plates are disposed and to direct cooling fluid through the clutches and respective clutch packs.

It should be understood that the present invention is not limited to the configuration shown in the figures. For example, the widths, lengths, and shapes of the components in the figures can be modified. Hub 48, segment 54, carrier 64, plate 70, and housing 72 can be formed by any means known in the art. In some aspects, some or all of hub 48, segment 54, carrier 64, plate 70, and housing 72 are formed by stamping.

To minimize axial flow of cooling fluid out of clutch assembly 44 and to optimize the flow of the fluid to inner clutch 46 and outer clutch 66, assembly 44 uses, to a great extent, components otherwise necessary for the mechanical operation of clutch assembly 44. For example, hub 12 (and segment 26), carrier 14 (and segment 28), and segment 50 all are used in the operation of the clutch assembly, for example, to transmit torque, and also form respective parts of the radial flow chamber. In some aspects (not shown), segment 54 is formed from components necessary for the mechanical operation of the clutch assembly, for example, segment 54 can be formed from segment 50 or carrier 64. In some aspects, plate 70 is part of a shim for clutch 66. In some aspects, segment 54 and plate 70 are not otherwise needed for mechanical function of the clutch assembly, for example, for torque transfer, but are relatively small in size and are configured to fit into existing spaces in assembly 44. Therefore, the benefits of the present invention are obtained with minimal increases to the size, cost, or complexity of the clutch assembly.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A hub and carrier assembly, comprising:
    a clutch carrier;
    a plurality of annular clutch plates having respective inner circumferential edges in contact with the clutch carrier; and,
    a hub directly connected to the clutch carrier and for transmitting torque from the clutch carrier, wherein said carrier forms at least one first opening with said hub, said hub and said carrier form at least one chamber, said at least one first opening and said at least one chamber are in fluid communication, said hub and carrier further comprise first and second radially disposed segments, respectively, and a portion of said at least one chamber is formed between said first and second radially disposed segments.

2. The hub and carrier assembly recited in claim 1 wherein said at least one first opening is axially aligned.

3. The hub and carrier assembly recited in claim 1 wherein said hub further comprises an interface for a shaft and said at least one first opening is proximate said interface.

4. The hub and carrier assembly recited in claim 1 wherein said at least one first opening comprises a single opening.

5. The hub and carrier assembly recited in claim 1 wherein said first radially disposed segment includes at least one second opening in fluid communication with said at least one chamber.

6. The hub and carrier assembly recited in claim 5 wherein said at least one first and second openings form the only openings to said at least one chamber.

7. The hub and carrier assembly recited in claim 5 wherein said first and second radially disposed segments are fixedly secured one to the other.

8. The hub and carrier assembly recited in claim 5 wherein said first and second radially disposed segments are arranged to transfer torque to said hub.

9. A hub and carrier assembly in a clutch assembly, comprising:
    a hub; and,
    a clutch carrier, wherein said carrier and hub form at least one first opening proximate a shaft interface for said hub, said hub and carrier form at least one chamber in fluid communication with said at least one first opening, first and second radially disposed segments of said hub and carrier, respectively, form a portion of said at least one chamber, and said first radially disposed segment includes at least one second axial opening in fluid communication with said at least one chamber.

10. A clutch assembly with a radial flow chamber, comprising:
    a first clutch carrier for a clutch in the assembly;
    a plurality of annular clutch plates having respective inner circumferential edges in contact with the first clutch carrier; and,
    a first hub directly connected to the first clutch carrier and for transmitting torque from the first clutch carrier, wherein said first hub and said first carrier form at least one first opening, said first hub and said first carrier form a first portion of at least one radial flow chamber in said clutch assembly, said at least one first opening and said at least one chamber are in fluid communication, said first hub and said first carrier further comprise first and second radially disposed segments, respectively, and said first and second radially disposed segments partially define said first portion.

11. The clutch assembly recited in claim 10 wherein said first hub comprises an interface for a shaft and said at least one first opening is proximate said interface.

12. The clutch assembly recited in claim 10 wherein wherein said first radially disposed segment includes at least one second opening.

13. The clutch assembly recited in claim 12 further comprising: a third radially disposed segment connected to a second hub; and, wherein a second portion of said at least one chamber is formed between said first and third radially disposed segments.

14. The clutch assembly recited in claim 13 wherein said at least one second opening is in fluid communication with said first and second portions.

15. The clutch assembly recited in claim 13 further comprising: a fourth radially disposed segment; and, wherein a third portion of said at least one chamber is formed between said second and fourth radially disposed segments, and wherein said third portion is in fluid communication with said clutch.

16. The clutch assembly recited in claim 15 wherein said fourth radially disposed segment is a first plate.

17. The clutch assembly recited in claim 15 wherein said fourth radially disposed segment is integral to said third segment.

18. The clutch assembly recited in claim 15 wherein said clutch assembly further comprises a second clutch carrier for a first outer clutch and said fourth radially disposed segment is formed by said second carrier.

19. The clutch assembly recited in claim 10 further comprising: a second plate and a second outer clutch; and, wherein said second plate forms at least a portion of an axial barrier with respect to said second outer clutch.

20. A clutch assembly with a radial flow passageway, comprising:
    first and second hubs; and,
    a carrier for a first clutch in said assembly, wherein said carrier forms at least one axial opening with said first hub, said first hub and said carrier form a first portion of at least one radial passageway in said clutch assembly, said first and second hubs form a second portion of said at least one radial passageway, said first hub comprises at least one opening in fluid communication with said first and second portions, and said second portion is in fluid communication with a chamber at least partially formed by an outer circumference of said carrier.

21. The clutch assembly recited in claim 20 further comprising: a first radially disposed segment, a first radially disposed plate, and a second clutch; and, wherein said second clutch is in fluid communication with said first clutch, said first radially disposed segment at least partially defines said chamber, and said first radially disposed plate forms at least a portion of an axial barrier with respect to said second clutch.

* * * * *